United States Patent

Horton

[15] 3,673,479

[45] June 27, 1972

[54] SINGLE TRIAC REVERSIBLE MOTOR CONTROL

[72] Inventor: Alfred A. Horton, Rockford, Ill.
[73] Assignee: Barber-Colman Company, Rockford, Ill.
[22] Filed: April 30, 1971
[21] Appl. No.: 139,089

[52] U.S. Cl. ................................................318/208, 318/345
[51] Int. Cl. ..........................................................H02p 7/62
[58] Field of Search..................318/208, 222, 223, 284, 288, 318/290, 345, 356, 237, 299, 688, 227

[56] References Cited

UNITED STATES PATENTS

| | | | |
|---|---|---|---|
| 3,404,325 | 10/1968 | Didwall | 318/208 |
| 3,463,933 | 8/1969 | Kompelien | 318/345 X |
| 3,588,647 | 6/1971 | Harwell | 318/345 X |

Primary Examiner—Harold Broome
Assistant Examiner—W. E. Duncanson, Jr.
Attorney—A. Richard Koch

[57] ABSTRACT

A single phase AC motor, biased to rotate in one direction, is made to stop when a controlled circuit tending to cause rotation in the opposite direction is energized by a half wave rectified alternating current and is made to rotate in the opposite direction when the controlled circuit is energized by alternating current. A triac rectifies the control current when fired in only one quadrant and passes alternating current when fired in two quadrants, a modulated DC gating current determining whether the triac is fired in one quadrant, in two quadrants or in none. Speed control may be exercised by controlling the phase angle of the firing.

10 Claims, 3 Drawing Figures

INVENTOR
ALFRED A. HORTON

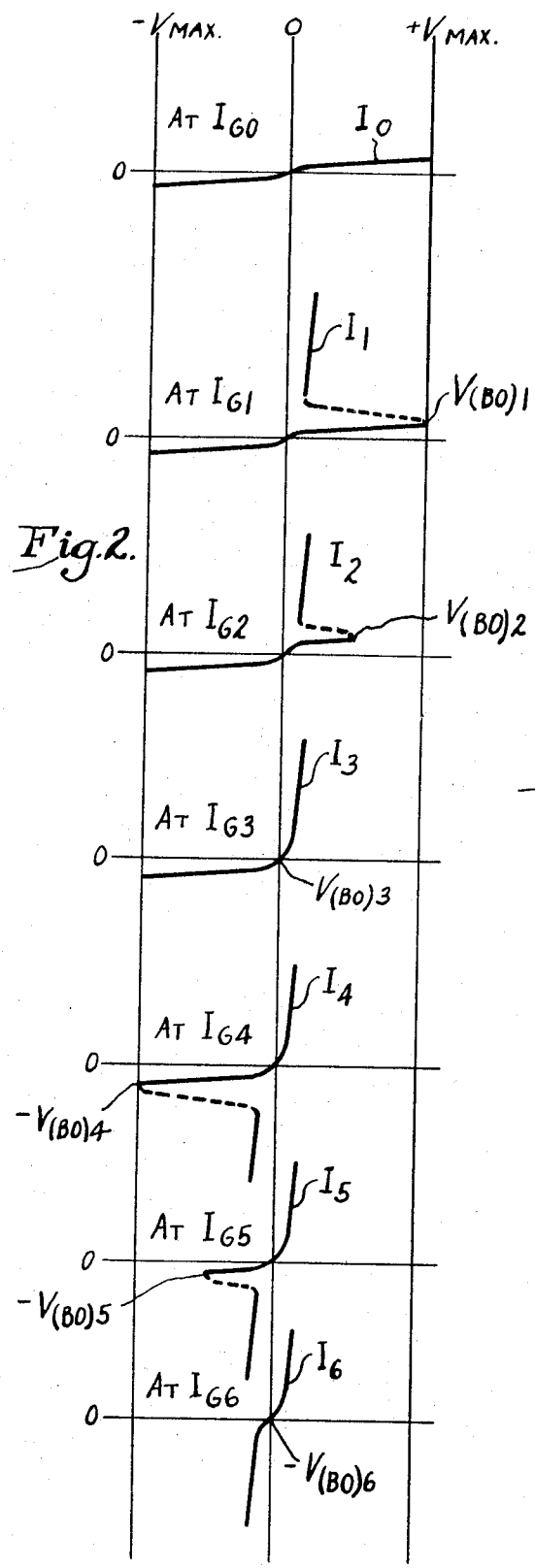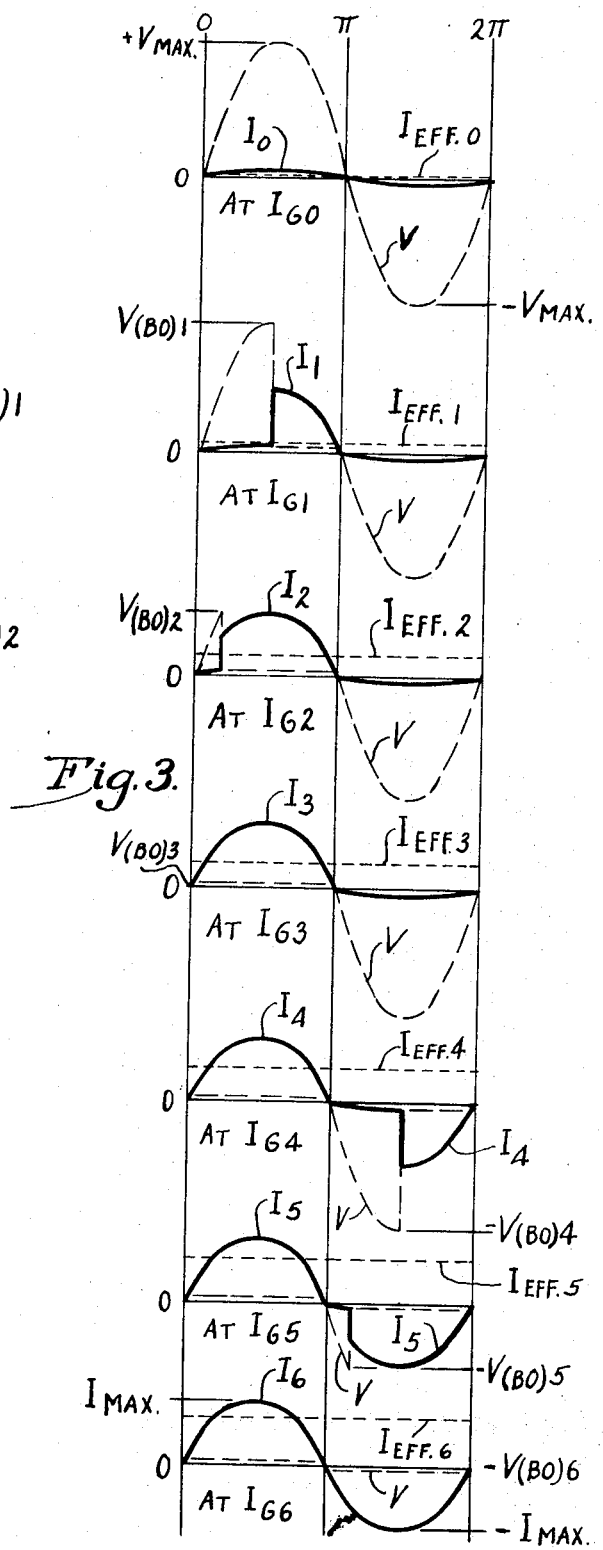

3,673,479

SINGLE TRIAC REVERSIBLE MOTOR CONTROL

BACKGROUND OF THE INVENTION

This invention is concerned with motor control systems for positioning a load in accordance with a condition sensitive signal.

In control systems it is frequently necessary to position a valve, damper, tool, work piece, or the like, in accordance with an error signal which is a function of a measured condition such as temperature, pressure, liquid level, fluid flow, attitude, cam follower position, etc. The systems may be of the open end or closed loop varieties. Often positioning is accomplished through control of an electric motor in accordance with the sense and/or the amplitude of an error signal. When there is no error the motor stops. This invention is concerned with control of single phase AC motors in such service.

Shaw, in U.S. Pat. No. 2,334,447 disclosed that a reversing shaded pole motor may be biased by shading rings on one set of shading poles to rotate in one direction, may be rotated in the opposite direction by shorting shading windings on the other set of shading poles, and may be stopped by closing the shading windings through a resistance such that the effects of the shading poles are balanced.

Triacs and other bidirectional thyristors are used to control the supply of alternating current to a load. For most applications it is considered desirable that they conduct current symmetrically in either direction. It is, however, well known that less gate current is required to fire a triac when the load current and gate current are flowing in the same direction than when flowing in opposite directions and that less gate current is required when the gate is at positive potential with respect to the common terminal. These characteristics are generally considered to be a nuisance and great efforts have been made to eliminate or reduce them. A more complete description of a bidirectional controlled switch by Gentry, Scace and Flowers, entitled "Bidirectional Triode P-N-P-N Switches," may be found in *Proceedings of the IEEE*, Vol. 53, No. 4, pages 355-369, April 1965.

SUMMARY OF THE INVENTION

This invention takes advantage of the assymmetrical firing characteristics of a bidirectional thyristor to control by a single such thyristor the starting, stopping and direction of motion of a single phase alternating current motor. Speed is also controlled as a result of the same assymmetrical characteristics. Control over the thyristor is exercised by a condition sensitive circuit. The control is simple and inexpensive.

BRIEF DESCRIPTION OF THE DRAWINGS

FIG. 2 comprises graphs showing the volt-ampere characteristic of triacs or similar bidirectional thyristors at various gate currents.

FIG. 3 comprises graphs showing the voltages and currents plotted against time at various gate currents.

DESCRIPTION OF THE PREFERRED EMBODIMENTS

Figure 1:
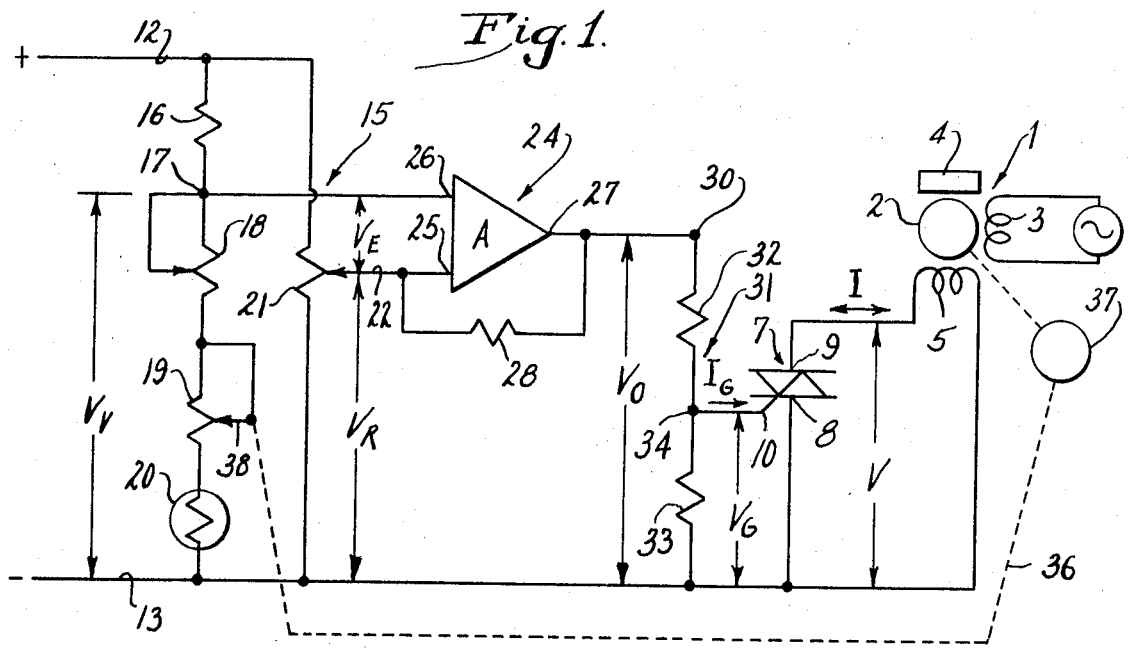
FIG. 1 is a schematic circuit diagram for a preferred embodiment of this invention.

As shown in FIG. 1, a reversible shaded pole motor 1 has a rotor 2, a primary winding 3 energized from an alternating current power supply, a shorted shading winding or ring 4 providing biasing torque tending to turn the rotor 2 in what will be called reverse direction, and a controlled shading winding 5 selectively shorted to provide torque tending to turn the rotor 2 in forward direction in opposition to the biasing torque provided by the shading ring 4. A bidirectional thyristor 7, an example being a triac, which has a pair of power terminals, identified as common terminal 8 and load terminal 9, and a gate terminal 10. The shading winding 5 is connected between terminals 8 and 9 to form a controllable circuit.

A regulated direct current power supply is connected between a hot line 12 (shown as +) and a reference line 13 (shown as —). An unbalanced bridge 15 has one arm comprising a fixed resistor 16 connected between the hot line 12 and a junction 17, a second arm comprising an adjustable set point resistor 18, a variable feedback resistor 19 and a condition sensitive variable resistor 20 connected between the junction 17 and the reference line 13, and an adjustable calibrating potentiometer 21 connected between line 12 and 13 to provide the other two arms of the bridge. A wiper 22 at any predetermined position on the calibrating potentiometer 21 supplies a fixed reference voltage $V_R$ to a differential input operational amplifier 24 at the non-inverting terminal thereof, while junction 17 supplies a condition sensitive variable voltage $V_V$ to the inverting input terminal 26 to provide between the input terminals an error signal voltage $V_E$. The output terminal 27 is connected to the non-inverting input terminal 25 through a feedback resistor 28 to establish the gain A of the amplifier 24. The output terminal 27 also supplies its output voltage $V_0$ to a control terminal 30, $V_0$ being equal to $AV_E$. A voltage divider 31, comprising a coupling resistor 32 and a gate shunting resistor 33 in series between control terminal 30 and the reference line 13, serves as a substantially constant load for the amplifier and provides at the junction 34 between resistors 32 and 33 a gate voltage $V_G$ which is a substantially constant fraction of the output voltage $V_0$. Junction 34 is connected to gate terminal 10 and reference line 13 is connected to the common terminal 8. The gate shunting resistor 33 is chosen to be of sufficiently high resistance to prevent accidental dv/dt firing of the thyristor 7, but of sufficiently low resistance so that the gate current $I_G$ flowing through the gate and common terminals 10 and 8 of thyristor 7 will have little effect on gate voltage $V_G$.

When an amplified error signal in the form of output voltage $V_0$ appears at control terminal 30, a gate current $I_G$ flows from junction 34 through the thyristor 7 between gate terminal 10 and common terminal 8 to reference line 13. If such gate current is of sufficient amplitude to fire the thyristor, the controlled circuit from the shading winding 5 through the thyristor between load terminal 9 and common terminal 8 back to shading winding 5 will be closed. When the shading winding 5 is thus shorted by thyristor 7, an alternating voltage V induced in the shading winding by the alternating current in primary winding 3 will cause an alternating load current I to flow through the controlled circuit and energize the winding 5 to produce torque tending to produce forward rotation of rotor 2. How this torque is controlled is explained later.

The circuit described above is an open loop controller. If a closed loop controller is desired, a feedback may be provided as by connection 36 from the rotor 2, or the motor driven load 37, to a wiper 38 on the feedback resistor 19.

It is well known that the voltage $V_{(BO)}$ at which a thyristor will break over is dependent upon the amplitude of the gate current $I_G$ between the gate and common terminals. It is also known that with a given gate current a bidirectional thyristor will break over at a lower voltage when the gate and load terminals are of the same polarity than when of opposite polarity. For bidirectional thyristors it is likewise known that the breakover will occur at lower voltage when the gate is positive with respect to the common terminal. In order to over come these characteristics thyristors are generally phase fired by pulses of sufficient amplitude that the thyristor can be fired at substantially any time during the cycle by delaying the imposition of the gating pulse for the desired time after the controlled alternating load voltage has passed through zero. The thyristor is thus fired at substantially the same phase angle regardless of polarity of the load voltage. When only on-off operation is desired a direct current gating circuit providing a gate current of sufficient amplitude to fire the thyristor early in the cycle regardless of load voltage polarity may be employed. Neither of these methods could produce the results obtained by this invention.

As shown in FIG. 2, when the gate current $I_G$ is zero, which condition is hereinafter designated as $I_{G0}$, the load current I will be substantially zero, which condition is hereinafter designated as $I_0$, between the instantaneous maximum positive and negative amplitudes, indicated by $+V_{MAX}$ and $-V_{MAX}$, of the alternating induced voltage V. The corresponding relationship between the instantaneous values of the induced voltage V and the zero load current $I_0$ is shown in FIG. 3 along with the root-mean-square load current, or effective load current $I_{EFF\ 0}$, which is likewise substantially zero. As the gate current $I_G$ is increased in amplitude to $I_{G1}$, the breakover voltage $V_{(BO)}$ between terminals 9 and 8 is reduced to the positive maximum controlled voltage $+V_{MAX}$, at which value the breakover voltage is herein designated as $V_{(BO)1}$. The triac 7 is then fired to conduct load current $I_1$ from load terminal 9 to common terminal 8 for the remaining quarter cycle of positive induced voltage V. The effective load current $I_{EFF\ 1}$ under this condition is one-quarter of the maximum effective load current $I_{EFF\ 6}$ as later defined. As the gate current is further increased to $I_{G2}$, the breakover voltage $V_{(BO)2}$ is less than the maximum induced voltage $+V_{MAX}$ and the triac 7 will be fired earlier in the half cycle when the induced voltage V reaches $V_{(BO)2}$. The resultant load current $I_2$ has a higher effective value $I_{EFF\ 2}$ because $I_2$ flows for a greater portion of the cycle than $I_1$. When the gate current is increased to $I_{G3}$, at which current the breakover voltage $V_{(BO)3}$ is substantially zero, load current $I_3$ will flow for substantially the entire half cycle and $I_{EFF\ 3}$ will be half of $I_{EFF\ 6}$. Whenever the gate current exceeds $I_{G3}$, the load current will flow for substantially the entire half cycle during which the load terminal 9 is positive with respect to the common terminal 8. At a gate current $I_4$ the thyristor 7 will be fired for conduction from common terminal 8 to load terminal 9 with the breakover voltage $-V_{(BO)4}$ equal to $-V_{MAX}$ so that load current $I_4$ will flow during the last half of the negative half cycle as well as during the entire positive half cycle, and the effective voltage $I_{EFF\ 4}$ will be approximately 75 percent of $I_{EFF\ 6}$. At higher gate currents such as $I_{G5}$, the breakover voltage $-V_{(BO)5}$ will be less than $-V_{MAX}$ so that load current $I_5$ will begin to flow earlier in the negative half cycle, again resulting in a higher effective load current $I_{EFF5}$. Whenever the gate current is increased to or beyond $I_{G6}$ at which current the breakover voltage $-V_{(BO)6}$ is substantially zero, load current $I_6$ will flow for substantially the entire cycle and the effective current $I_{EFF\ 6}$, which is the maximum effective current, will be substantially $0.707\ I_{MAX}$ When the shading winding 5 is shorted during substantially the entire cycle, due to a gating current $I_{G6}$ or more firing the thyristor 7 at substantially zero angle on both half cycles, the maximum effective load current $I_{EFF\ 6}$ will flow through the winding, producing the maximum torque tending to move the rotor 2 in forward direction. This maximum torque will be hereafter referred to as full torque. When the gating current is reduced to $I_{G3}$, $I_{EFF\ 3}$ is only half of $I_{EFF\ 6}$ and the torque produced is proportionately reduced to half of full torque, commonly referred to as half torque. The shading ring 4 is selected such that the voltage induced in it by the alternating current in the primary winding 3 will cause an alternating current in the ring of an amplitude to produce half torque tending to move the rotor 2 in reverse direction. When this reverse half torque is balanced by a forward half torque produced as a result of a gate current between $I_{G3}$ and $I_{G4}$ firing the thyristor 7 for half cycles of only one polarity, there will be no tendency to move the rotor in either direction. If the gate current is less than $I_{G1}$ so that the thyristor 7 is not fired at any time, no current will flow through the shading winding 5 and no forward torque will be produced to oppose the reverse torque and the rotor 2 will tend to be moved in reverse direction at normal speed. If the gate current is equal to or exceeds $I_{G6}$, so that substantially full alternating current flows through shading winding 5 and forward full torque is produced in opposition to the reverse half torque, a resultant forward half torque will tend to move the rotor in forward direction at normal speed.

By refining the above motor reversing control circuit, some measure of speed control is also possible. The forward torque produced by load current I through the shading winding 5 is proportional to the effective value of the load current, or $I_{EFF}$. When the gate current is between $I_{G1}$ and $I_{G3}$, a corresponding load current between $I_1$ and $I_3$ will flow for between one-quarter and one-half cycle, producing an effective current between $I_{EFF\ 1}$ and $I_{EFF\ 3}$, which will provide between one-quarter and one-half torque. Such torque will not balance or overcome the reverse half torque but will cause a resultant reverse torque between zero and one-quarter torque, which will only provide a reduced speed in reverse direction. In like manner, when the gate current is between $I_{G4}$ and $I_{G6}$, the forward torque will overcome the reverse torque, producing a resultant forward torque between one-quarter and one-half torque, which will provide only a reduced speed in forward direction.

By eliminating the shading ring 4, a unidirectional shaded pole motor is obtained and with no biasing torque to overcome a range of torques from zero to full torque is available to move the rotor 2 in a predetermined direction. Under this condition half torque will provide movement in the predetermined direction but at a lesser speed, dependent upon the driven load 37, than when full torque is available.

This invention may also be employed to control linear motors in which a reciprocable member replaces the rotatable member, or rotor, moving linearly with respect to the windings in response to electromagnetic forces produced by current flow in the windings.

The embodiments described are for purposes of illustration only and not to define the scope of this invention which is limited only by the claims.

I claim:

1. A motor control system comprising a reversible electric motor, an alternating current power supply connected to energize the motor, a movable member in said motor, means providing a biasing force tending to move the member in one direction, a controllable circuit when closed producing a force tending to move the member in opposite to said one direction, a bidirectional thyristor having load, gate and common terminals, said thyristor connected at the load and common terminals in said controllable circuit to selectively close the circuit, means for producing a gating signal of variable amplitude between said gate and common terminals, a first amplitude of said gating signal firing the thyristor into conduction only when said gate and load terminals are of like polarity with respect to the common terminal whereby said controllable circuit being energized by half wave rectified alternating current produces sufficient force to substantially balance the biasing force and effectively eliminate any tendency to move the member, and a greater second amplitude of said gating signal firing the thyristor into substantially continuous conduction whereby said controllable circuit being energized by alternating current produces force overcoming the biasing force and supplying a resultant force tending to move the member is said opposite direction.

2. A motor control system according to claim 1 wherein said gating signal having an amplitude less than said first amplitude phase fires the thyristor to control the speed of motion of said member in said one direction.

3. A motor control system according to claim 1 wherein an amplitude of greater than said first amplitude phase fires the thyristor to control the speed of motion of said member in said opposite direction.

4. A motor control system according to claim 1 wherein said biasing means comprises a continuously energized winding providing a magnetic force tending to move the member in said one direction.

5. A motor control system according to claim 1 additionally comprising a gate shunting resistor connected between the gate and common terminals.

6. A motor control system comprising a reversible shaded pole motor having a rotor, a primary winding and first and second shading windings, an alternating current power supply connected to energize said primary winding, said first shading winding continuously shorted to produce a fixed biasing torque tending to rotate the rotor in one direction, said second shading winding controllable to produce a variable torque tending to rotate the rotor in opposite to said one direction, a bidirectional thyristor having load, gate and common terminals, said thyristor connected at the load and common terminals in series with said second shading winding to selectively short said second shading winding, and means for producing a gating signal of variable amplitude between said gate and common terminals, a first amplitude of said gating signal firing the thyristor into conduction only when said gate and load terminals are of like polarity with respect to the common terminal to energize said second shading winding with half wave rectified alternating current producing sufficient torque to substantially balance the biasing torque and effectively eliminate any tendency to rotate the rotor, and a greater second amplitude of said gating signal firing the thyristor into substantially continuous conduction to energize said second shading winding with alternating current producing torque to overcome the biasing torque and supply a resultant torque tending to rotate the rotor in said opposite direction.

7. A motor control system comprising an electric motor, an alternating current power supply connected to energize said motor, a movable member in the motor, a controllable circuit producing a variable force tending to move said member in a predetermined direction, a bidirectional thyristor having load, gate and common terminals, means for producing a gating signal of variable amplitude between said gate and common terminals, means for connecting said thyristor at the load and common terminals in the controllable circuit to selectively close said circuit, a first amplitude of the gating signal firing said thyristor into conduction only when said gate and load terminals are of like polarity with respect to the common terminal to energize said controlled circuit with half wave rectified alternating current to produce a first force tending to move said member in the predetermined direction, and a greater second amplitude of the gating signal firing said thyristor into substantially continuous conduction to energize said controlled circuit with alternating current to produce a second force tending to move said member in the predetermined direction, said second force being substantially double the first force.

8. A motor control system according to claim 7 wherein the gating signal having an amplitude less than said second amplitude phase fires the thyristor to produce a force less than said second force tending to move said member in the predetermined direction.

9. A motor control circuit for a motor controlled by the opening and closing of a controllable circuit energized from an alternating current power supply, said motor control circuit comprising a bidirectional thyristor having load, gate and common terminals, means for producing a direct current gating signal of variable amplitude in response to a variable condition, said gate and common terminals receiving the gating signal, and means for connecting said load and common terminals into the controllable circuit whereby conduction and non-conduction of said thyristor closes and opens the controllable circuit, a first amplitude of said gating signal firing the thyristor into conduction only when said gate and load terminals are of like polarity with respect to the common terminal, and a greater second amplitude of said gating signal firing the thyristor into substantially continuous conduction.

10. A motor control circuit according to claim 9 wherein an amplitude less than said second amplitude of the gating signal phase fires the thyristor.

* * * * *